(12) United States Patent
Arai et al.

(10) Patent No.: US 7,132,074 B2
(45) Date of Patent: Nov. 7, 2006

(54) SOLVENT CASTING PROCESS

(75) Inventors: Toshinao Arai, Minami-Ashigara (JP);
Hidekazu Yamazaki, Minami-Ashigara (JP); Tadahiro Tsujimoto, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 140 days.

(21) Appl. No.: 10/634,833

(22) Filed: Aug. 6, 2003

(65) Prior Publication Data
US 2004/0027509 A1    Feb. 12, 2004

(30) Foreign Application Priority Data
Aug. 6, 2002    (JP) .............................. 2002-228371

(51) Int. Cl.
*B29D 7/00*    (2006.01)
(52) U.S. Cl. ...................................... 264/216
(58) Field of Classification Search ................. 264/216
See application file for complete search history.

(56) References Cited

U.S. PATENT DOCUMENTS 6,660,211 B1 *   12/2003   Topolkaraev et al. ....... 264/444

\* cited by examiner

*Primary Examiner*—Suzanne E. McDowell
(74) *Attorney, Agent, or Firm*—Young & Thompson

(57) ABSTRACT

The present invention provides a solvent casting process which comprises casting a dope which is a solution containing at least one kind of a polymer from a casting die onto a casting support, stripping off from the casting support and drying, wherein the force necessary for stripping off the dope from the die lip end of the casting die is 40 g/cm or smaller. According to the present invention, the employment of the foregoing constitution prevents the formation of the slugs at lateral edge portions of the dope because the cast dope would not adhere to the die lip end portion of the casting die. As a result, because a breaking down of the film would not occur without washing the apparatus, an efficient production of a film having superior evenness in the flatness can be achieved.

15 Claims, 1 Drawing Sheet

SOLVENT CASTING PROCESS

FIELD OF THE INVENTION

The present invention relates to a solvent casting process for producing a cellulose triacetate film, etc. More particularly, the present invention relates to a solvent casting process preventing slug formation on a die lip end of a casting die when a dope is cast from the casting die.

BACKGROUND OF THE INVENTION

Generally, cellulose triacetate film is employed for a film such as a protective film for a polarizing plate or an optical by functional film, and a solvent casting process produces the cellulose triacetate film. In the solvent casting process, a dope being a polymer solution consisting of a cellulose acetate with high concentration prepared by mixing and dispersing a cellulose acetate and a solvent, is continuously cast from a casting die onto a casting support, stripped off after being dehumidified to some extent on the casting support, dried and wound to obtain a roll of the film.

By the way, at the timing of casting the dope from the casting die onto the casting support, an uneven surface drying defect by a sojourn of the dope may be formed on the die lip end. The uneven surface drying defect tends to form particularly at both lateral edge portions of the cast dope (the uneven surface drying defects at both side edge portions are referred to as slugs at lateral edge portions below). In the case where the uneven surface drying defect forms on the die lip end, streaks would appear beginning at the uneven surface drying defects thereby degrading the surface quality of the film.

Further, in the case where the slugs are formed at both lateral edge portions of the cast dope, they contact with a web of dope after being cast from the casting die and before it impinges to the casting support (referred to as "bead" below), thereby making problems of causing thickness unevenness at the lateral edge portions of the film, or causing remained dope after the stripping off of the film from the casting support, and causing the generation of a tearing point at the lateral edge portions of the film. There is another problem that the slugs may leave off from the dope and hung on a labyrinth part along the way before the stripping off until contacting with the film thereby causing a breaking down of the film.

Accordingly, various countermeasures for preventing the slugs at lateral edge portions are conventionally proposed particularly with regards to both side edge portions. For example, U.S. Pat. No, 3,112,528, JP 2-208650A, JP 5-86212A, etc. disclose a method of dripping a solvent to both lateral edge portions of a discharge lip of a casting die, or a method of depositing a mixture of vapor of the solvent and air to both lateral edge portions of a discharge lip of a casting die.

However, these conventionally proposed methods for preventing the slugs at lateral edge portions were not sufficiently effective depending on the characteristics of the dope because they are based on the principle of inhibiting the bad effects of the slugs at lateral edge portions by dissolving them again.

For example, JP 2-208650A and JP 5-86212A proposed as shown in FIG. 3 providing a feed pipe 32 for feeding a solvent at both lateral edges of a casting die 31, and by feeding the solvent 33 from the feed pipe 32 at both lateral edges of a bead 34, aiming to prevent the slugs at lateral edge portions. However, these conventional methods were unable to completely prevent the slugs at lateral edge portions, and the slug 35 may often formed on both lateral edge portions of the bead. By the way, numerical symbol 36 shows an impinging point of the bead with the casting support.

SUMMARY OF THE INVENTION.

Overcoming the foregoing problems, an object of the present invention is to provide a solvent casting process effectively preventing a dope from slug formation, particularly slugs at lateral edge portions, on the die lip end of a casting die by inhibition of sojourns in the dope.

In order to achieve the object, the inventors investigated eagerly about various conditions of the dope, casting die, etc., without slug formation, and found that the slugs, particularly slugs at lateral edge portions, would not form when a force necessary for separating the dope from the die lip end of the casting die is within a specified range. The present invention was completed by these findings.

The present invention provides a solvent casting process in which, in a film production process which comprises casting dope which is a solution containing at least one kind of a polymer from a casting die onto a casting support, stripping off from the casting support, and drying, wherein the force necessary for separating the dope from the die lip end of the casting die is 40 g/cm or smaller.

According to the solvent casting process of the present invention, a slug formation, particularly slugs at lateral edge portions, on the die lip end of a casting die is prevented by settling the force necessary for separating the dope from the die lip end of the casting die to 40 g/cm or smaller. The slugs are considered to be formed by the dope touching on the die lip end of a casting die adheres there and solidifies induced by the volatilization of the solvent in the dope. Particularly, the foregoing phenomena are exaggerating at lateral edge portions. Therefore, it is desirable that a sojourn in the dope would not induced on the die lip end of the casting die, and the dope would not adhere there when the force necessary for separating the dope from the die lip-end of the casting die is 40 g/cm or smaller.

Further, even when the dope adheres on the die lip end of the casting die, settling a static drawing tension made in a range of 100–2000 Pa would prevent a slug formation on the die lip end of the casting die because the adhered dope becomes easy to leave according to the present invention. Still further, the object of the present invention is achieved when defining a shear viscosity of the dope in the casting die as $\eta$ [Pa·s], and defining a drawing velocity of the dope among being cast from the casting die to landing the casting support as $\epsilon$[1/second], a dynamic drawing force "$3 \cdot \eta \cdot \epsilon$" satisfies the following formula (1):

$$1500[Pa] < 3 \cdot \eta \cdot \epsilon < 15000[Pa] \tag{1}$$

The present invention provides a solvent casting process in which, in a film production process which comprises casting a dope which is a solution containing at least one kind of a polymer from a casting die onto a casting support, stripping off from the casting support, and drying, wherein a mixed solvent containing a solvent substantially without having solubility with the polymer of the dope is dripped to the die lip of the casting die, adjusting the drawing tension of the dope ($3 \cdot \eta \cdot \epsilon$=dynamic expansion force) within the foregoing range.

In the solvent casting process according to the present invention, by dripping the mixed solvent containing a solvent substantially without having solubility with the polymer of the dope, the drawing tension of the dope is adjustable and as a result, the adhesion of the dope to the die lip end is prevented.

DESCRIPTION OF THE PREFERRED EMBODIMENTS

In the solvent casting process according to the present invention, because the dope becomes uneasy to adhere to the die lip end by decreasing the force necessary for separating the dope from the die lip end of the casting die (referred to as "separation force" below), the slug formation is suppressed by an ability of preventing sojourns in the dope. The separation force is required to be 40 g/cm or smaller, preferable to be 20 g/cm or smaller, and more preferable to be 5 g/cm or smaller. Additionally, the separation force must satisfy the foregoing condition approximately over the entire width of the dope cast from the die lip of the casting die.

Figure 1:
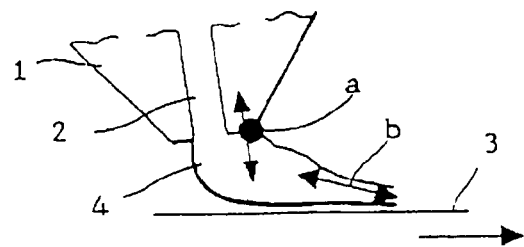
FIG. 1 is a schematic illustration showing a relation between an adhesive force and an drawing force in a bead.

Particularly, formation of the slugs at the lateral edge portions easily happens because there are wide gas-liquid interface at the lateral edge portions. The slugs at lateral edge portions shall be explained below in further details:

As illustrated in FIG. 1, having cast dope 2 from casting die 1 onto casting support 3, when an adhesive force (separation force) "a" between bead 4 and casting die 1 is greater than drawing force "b" of bead 4, a sojourn among the dope in casting die 1 induces the formation of slugs 5 at lateral edge portions. Accordingly, the smaller the adhesive force "a", the fewer the probability of the formation of the slugs at lateral edge portions, and the slugs scarcely forms when the adhesive force is 40 g/cm or smaller.

Regarding the measurement of the separation force, it is conducted by casting the dope on a flat plate made of the same material as the die lip end of the casting die in film-shaped, catching the cast end of the film by a clip, and measuring the separation force between them by a load cell connected to the clip. Practically, the separation force cannot be measured, unless the film is solidified up to separable by decreasing volatile component of the film, predicted values based on the measurement data are employed. That is, a relation between the separation force and volatile component content is measured, and the separation force at a prescribed volatile component content is determined by extraporating the relation.

In order to adjust the separation force, various means may be employed without being particularly limited, including, for example, means of promoting a gelation by the use of the solvent without having solubility for polymer to decrease separation force, and means of adjusting the temperature of the solvent dripping on the die lip end of the casting die in accordance with the formula (3). Another means include, settling the amount of the solvent dripping at the lateral edge portions of the die lip of the casting die in the range from 0.02 milliliter/minute to 1.0 milliliter/minute as the flow rate as well as settling variation of the flow rate at the lateral edge portions to 30% or smaller of the average value, and settling the flow rate of a dripping solvent, in the case where the solvent is fed to at least one side of the bead, in the range from 2 milliliter/minute to 1000 milliliter/minute per 1 m of the liquid contact area of the die lip in one side as well as settling variation of the flow rate excluding the lateral edge portions to 30% or smaller of average value. Still another means include water repellent treatment on the die lip end and addition of a separation accelerator in the dope. By the way, the lateral edge portions define as both side edge portions having a width of at least about 10 mm on the die lip end, Further, it was found that the slugs are prevented from forming by increasing a drawing force of the dope in addition to reducing separation force in the present invention. As an indicator of the drawing force, an expression by static drawing force is employed here.

In other words, according to the solvent casting process of the present invention, it is desirable that a stable casting can be achieved because the slugs on the leading end portions, particularly at the lateral edge portions, should be prevented by settling the stress in static drawing at the lateral edge portions of the dope on its leading end within the range of 100–2000 Pa, more desirable within the range of 200–1900 Pa, and most desirable within the range of 400–1700 Pa. When the stress in static drawing is smaller than 100 Pa, the dope cannot remove the slugs because the sojourn in the dope at the die lip end easily occurs. Further, when the stress in static drawing exceeds 2000 Pa, a fluctuation of a bead edge becomes large, and a flatness of the film deteriorates.

That is to say, the slugs on the die lip end, particularly slugs at lateral edge portions, are formed because the dope contacts and adheres on the lip surface of the leading end of a lip, and solidifies by the volatilization of a solvent in the dope. Therefore, it is favorable that the dope does not adhere on the die lip end, or does not sojourn. As the foregoing description, reducing the separation force between the dope and the die lip end portion is effective for the prevention. Moreover, even if the slugs form, they are removed being carried by a continuously supplied dope by increasing the drawing force of the dope. Therefore, it is important to control the separation force and the drawing force.

Regarding the measurement of the stress in static drawing, it is conducted by measuring the maximum stress in dope drawing contacting with a flat plate by the use of a spring balance.

Further, dynamic drawing force is expressed with "$3\cdot\eta\cdot\epsilon$".

Even though the slugs are formed, they are removed by the dope when, defining a shear viscosity of the dope in the casting die as $\eta$ [Pa·s]; and defining a drawing velocity of the dope among being cast from the casting die to landing the casting support as $\epsilon$ [1/second], a dynamic drawing force "$3\cdot\eta\cdot\epsilon$" satisfies the following formula (1):

$$150[Pa]<3\cdot\eta\cdot\epsilon<15000[Pa] \qquad (1)$$

Further, it is desirable that the dynamic drawing force "$3\cdot\eta\cdot\epsilon$" satisfies the following formula (1'):

$$500[Pa]<3\cdot\eta\cdot\epsilon<10000[Pa] \qquad (1')$$

When the "$3\cdot\eta\cdot\epsilon$" is 150 [Pa] or smaller, the slugs cannot be removed because the sojourn in the dope on the die lip easily occur. Further, when the "$3\cdot\eta\cdot\epsilon$" is 15000 [Pa] or greater, a fluctuation of a bead edge becomes large, and a flatness of the film degrades.

Furthermore, regarding variation of the foregoing "$\eta\cdot\epsilon$", it is desirable to be to 30% or smaller of the average value, and more desirable to be 10% or smaller of the average value. When variation of a "$\eta\cdot\epsilon$" exceeds 30% of the average value, the separation of the dope from the lip becomes unstable and the dope adheres to the lip because the bead fluctuate, causing not only the uneven surface drying defect but also the deteriorated surface quality.

The means for adjusting dynamic and static drawing force are characterized in promoting gelation by the use of the solvent having incapability of dissolving the polymer or adjusting the temperature and the flow rate of the solvent being dropped.

Defining the temperature of the dope cast from the casting die as Tc [° C.] and defining the feeding temperature of the dope until just before the casting die as Tp [° C.], it is desirable that the relation between Tc and Tp satisfies the following formula (2):

$$Tp-50<Tc<Tp \quad (2)$$

It is more desirable that the relation between Tc and Tp satisfies the following formula (2'):

$$Tp-30<Tc<Tp \quad (2')$$

Tp is determined by mounting a temperature-sensing resistor to the dope feeding line, and measured continuously on line.

When Tc is (Tp−50) or lower, the bead becomes unstable at high viscosity and the bead swings inducing the dope to adhere on the die lip thereby causing not only the formation of an uneven surface drying defect but also the degradation of the surface quality. Further, when Tc is equal to or higher than Tp, dissolved gas appears among the dope and foams generate and accordingly, the dope adheres on the die lip thereby causing the formation of an uneven surface drying defect.

Although it is desirable that, as mentioned above, the stress in static expansion of the dope is from 100 Pa to 2000 Pa in the present invention, typical example of the adjusting method for stress in drawing of the dope may be dripping a solution (referred to as "dripping solution" below) containing a solvent substantially not having solubility for the polymer (referred to as "solvent without solubility for polymer" below) in the dope on the die lip of the casting die.

It is preferable that the dripping solution contains the solvent without solubility for polymer in an amount of from 5 mass % to 100 mass %, more preferably 10 mass % to 100 mass %. When the amount of the solvent without solubility for polymer is less than 5 mass %, a visco-elasticity of the dope decreases and the sojourn in the dope will easily occur on the die lip of the casting die.

Typical examples of the solvent without solubility for polymer include alcohols such as methanol, butanol, ethanol, and propanol.

Examples of the solvent used for dripping solution aside from the solvent without solubility for polymer include methylene chloride, methyl acetate, acetone, etc.

Further, it was found that the temperature of the dripping solution gives big influence on the formation of the uneven surface drying defect, That is, defining the temperature of the dripping solution as Ts [° C.] and defining the temperature of the dope being cast as Td [° C.], it is desirable that the relation between Ts and Td satisfies the following formula (3):

$$Td-50<Ts<Td+10 \quad (3)$$

It is more desirable that the relation between Ts and Td satisfy the following formula (3').

$$Td-30<Ts<Td \quad (3')$$

When Ts is (Td−50) or lower, the dope is cooled down and the visco-elasticity of the dope increases thereby causing the gelation of the dope on the die tip of the casting dies, resulting in the whitening problem that degrade the quality. Further, when Ts exceeds (Td+10), the effect of the dripping solution decreases because it easily volatilizes.

It is preferable that the dripping solution drips with a flow rate of from 0.02 milliliter/minute to 1.0 milliliter/minute, more preferably 0.04 milliliter/minute to 0.8 milliliter/minute at the lateral edge portions of the discharge lip in the casting die with variation of the flow rate equal to or smaller than 30% of the average value. When the flow rate is 0.02 milliliter/minute or slower the effect of preventing the slug formation eliminate and when the flow rate is 1.0 milliliter/minute or faster, it results in the whitening problem that degrade the quality. Still further, it is preferable that the dripping solution drips with a flow rate from 2 milliliter/minute to 1000 milliliter/minute, more preferably 4 milliliter/minute per 1 m of liquid contact area on the leading end of the discharge lip another from the lateral edge portions of the discharge lip in the casting die with variation of the flow rate equal to or smaller than 30% of the average value in the case of feeding the dripping solution on at least one side of the bead.

The foregoing dripping solution may optionally contain various additives such as, for example, surfactants, separation accelerators, etc., for reducing the separation.

At least one kind of surfactant may be added to the dripping solution, and by the addition of the surfactant, the separation of the cast dope from the die lip of the casting die is accelerated. Phosphoric acid-based surfactant, sulfonic acid-based surfactant, carboxylate-based surfactant, nonionic surfactant, anionic surfactant, cationic surfactant, etc. may be employed as surfactant without particularly limited.

The nonionic surfactant means a surfactant having nonionic hydrophilic group such as polyoxyethylene, polyoxypropylene, polyoxybutylene, polyglycidyl or sorbiton. Specific examples of the nonionic surfactant include polyoxyethylene alkylether, polyoxyethylene alkyl phenyl ether, polyoxyethylene-polyoxypropyleneglycole, polyalcohol aliphatic acid partial ester, polyoxyethylene polyalcohol aliphatic acid partial ester, polyoxyethylene fatty acid ester, polyglycerol fatty acid ester, aliphatic acid diethanoleamide, triethanolamine aliphatic acid partial ester.

Carboxylate salt, sulfate salt, sulfonic acid salt, phosphate salt are employed as the anionic surfactant. Typical examples of the anionic surfactant include fatty acid salt, alkylbenzenesulfone acid salt, alkylnaphthalenesulfone acid salt, alkylsulfone acid salt, α-olefinsulfone acid salt, dialkylsulfone Butanedioic acid salt, α-sulfonated fatty acid salt, N-Methyl-N oleyl taurine, petroleum sulfonic acid salt, alkyl sulfate salt, Turkey red oil tallow, polyoxyethylene alkylether sulfate, polyoxyethylene alkyl phenyl ethereal sulfate salt, polyoxyethylene stylenated phenylethereal sulfate salt, alkylphosphate salt, polyoxyethylene alkylether phosphate, naphthalenesulfone acid salt formaldehyde condensate, etc.

The cationic surfactant is amine salt, the fourth grade ammonium salt, pyridium salt, etc. and examples are the first, second and third fatty amine salt, the fourth grade ammonium salt (tetraalkylammonium salt, trialkylbenzylammonium salt, alkyl pyridium salt, alkyl imidazolium salt, etc.). The amphoterism-based surfactant is carboxy betaine, sulfobetaine, etc. and examples are N-trialkyl-N-carboxymethyl ammonium betaine, N-trialkyl-N-sulfoalkylaneanmoniumbetaines.

At least one kind of separation accelerator may be added to the dripping solution. By the addition of the separation accelerator, the separation of the cast dope from the die lip of the casting die is improved. The separation accelerator is represented by the following general formula (1) or the following general formula (2).

$$(R_1—B_1—O)_{n1}—P(=O)—(OM_1)_{n2} \quad \text{General formula (1):}$$

$$R_2—B_2—X \quad \text{General formula (2):}$$

wherein $R_1$ and $R_2$ represent substituted or unsubstituted alkyl group, alkenyl group, aralkyl group, and aryl group each having 4 to 40 carbon atoms and $M_1$ represents alkali metals, ammonia, or low grade alkylamine. Further, $B_1$ and $B_2$ represent coupling radical of 2 valences, X represents carboxylic acid (or its salt), sulfonic acid (or its salt), or sulfuric ester (or its salt). An integer of 1 or 2 is represented by n1, and an integer of (3–n1) is represented by n2.

Favorable examples of $R_1$ and $R_2$ represent substituted or unsubstituted alkyl group having 4 to 10 carbon atoms (such as butyl, hexyl, octyl, 2-ethylhexyl, nonyl, dodecyl, hexadecyl, octadecyl, eighkosanyl, docosanyl, mylicyl), substituted or unsubstituted alkenyl group having 4 to 40 carbon atoms (such as 2-hexenyl, 9-decenyl, oleyl), substituted or unsubstituted aryl group having 4 to 40 carbon atoms (such as phenyl, naphthyl, methylphenyl, dimethylphenyl, trimethylphenyl, ethylphenyl, propyl phenyl, diisopropylphenyl, triisopropyl phenyl, t-butylphenyl, di-t-butylphenyl, tri-t-butylphenyl, isopentyl phenyl, octylphenyl, iso octylphenyl, iso nonylphenyl, di iso nonylphenyl, dodecyl phenyl, iso pentadecyl phenyl).

More preferable alkyl group examples include hexyl, octyl, 2-ethylhexyl, nonyl, dodecyl, hexadecyl, octadecyl, docosanyl. More preferable alkenyl group examples include oleyl. More preferable aryl group examples include phenyl, naphthyl, trimethylphenyl, diisopropylphenyl, triisopropyl phenyl, di-t-butylphenyl, tri-t-butylphenyl, iso octylphenyl, iso nonylphenyl, di iso nonylphenyl, dodecylisopentadedecylphenyl.

Next, the following is a description about the coupling radical of 2 valences, $B_1$ and $B_2$:

They are, alkylene, poly (degree of polymerization: 1–50) oxyethylene, poly (degree of polymerization: 1–50) oxypropylene, poly (degree of polymerization: 1–50) oxyglycelin, each having 4 to 10 carbon atoms and the mixture of these are also employable. Preferable examples of the coupling radical include methylene, ethylene, propylene, butylene, poly (degree of polymerization: 1–25) oxyethylene, poly (degree of polymerization: 1–25) oxypropylene and poly (degree of polymerization: 1–15) oxyglyceriool. Next, X represents carboxylic acid (or, its salt), sulfonic acid (or, its salt), or sulfuric ester (or, its salt). Among these, X is particularly desirable to be sulfonic acid (or, its salt) or sulfuric ester (or, its salt). Preferable examples of salt include Na, K, ammonium, trimethylamine and triethanolamine.

In the following, preferable examples of the separation accelerator in the present invention will be described, but it is not limited to these.

RZ-1: $C_8H_{17}O—P(=O)—(OH)_2$
RZ-2: $C_{12}H_{25}O—P(=O)—(OK)_2$
RZ-3: $C_{12}H_{25}OCH_2CH_2O—P(=O)—(OK)_2$
RZ-4: $C_{15}H_{31}(OCH_2CH_2)_5O—P(=O)—(OK)_2$
RZ-5: $\{C_{12}H_{25}O(CH_2CH_2O)_5\}_2—P(=O)—OH$
RZ-6: $\{C_{18}H_{35}(OCH_2CH_2)_8O\}_2—P(=O)ONH_4$
RZ-7: $(t-C_4H_9)_3—C_6H_2—OCH_2CH_2O—P(=O)—(OK)_2$
RZ-8: $(iso-C_9H_{19}—C_6H_4—O—(CH_2CH_2O)_5—P(=O)—(OK)(OH)$
RZ-9: $C_{12}H_{25}SO_3Na$
RZ-10: $C_{12}H_{25}OSO_3Na$
RZ-11: $C_{17}H_{33}COOH$
RZ-12: $C_{17}H_{33}COOH·N(CH_2CH_2OH)_3$
RZ-13: $iso-C_8H_{17}—C_6H_4—O—(CH_2CH_2O)_3—(CH_2)_2SO_3Na$
RZ-14: $(iso-C_9H_{19})_2—C_6H_3—O—(CH_2CH_2O)_3—(CH_2)_4SO_3Na$
RZ-15: Triisopropyl naphthalene sodium sulfonate
RZ-16: tri-t-butylnaphthalene sodium sulfonate
RZ-17: $C_{17}H_{33}CON(CH_3)CH_2CH_2SO_3Na$
RZ-18: $C_{12}H_{25}—C_6H_4SO_3.NH_4$ The film produced by the solvent casting process of the present invention may be either a monolayer film or a multilayer film. In the case where the multilayer film is produced, at least two kinds of the dopes are prepared and they may be cast with co-extrusion or successive-extrusion. At least one kind of the dope among the dopes prepared is desirable to have an active beam-reactivity.

Further, at least one kind of the dope among the foregoing dopes prepared is desirable to have phase separation capability after casting. Still further, at least one kind of the dope among the foregoing dopes prepared is desirable to initiate gelation after casting.

Still further, at least one kind of the dope among the foregoing dopes prepared is desirable to include solid particles having the difference within 0.1–2.5 in index of refraction with polymer medium in an amount of 0.1 weight % or more.

As the solid particles, silica, kaolin, talc, diatomaceous earth, quartz, calcium carbonate, barium sulfate, titania, alumina, and so on can be optionally used depending on the purpose.

As the polymer solution for the process for solvent casting of the present invention, solution such as cellulose ester, polycarbonate, aramid series polymer, norbornen series polymer may be applied. As the cellulose acylate, it is desirable to use low-grade fatty acid ester of cellulose. The low-grade fatty acid means a fatty acid having 6 or less of carbon atoms. Regarding the number of carbon atoms, it is preferable to be 2 (cellulose acetate), 3 (cellulose propionate) or 4 (cellulose butylate). Among these, cellulose acetate is particularly preferable. A blended fatty acid ester such as cellulose acetate propionate and cellulose acetate butylate may be used as the cellulose ester.

Typical examples of the organic solvent to be used for the dope include hydrocarbon (example: benzene, toluene, cyclopentane, cyclohexane, cycloheptane, cyclooctane), halogenated hydrocarbon (example: methylene chloride, chlorobenzene), ethyl alcohol (example: methanol, ethanol, diethylene glycol, n-propyl alcohol, isopropanol, n-butanol, propanol, isopropanole, 1-butanol, t-butanol, 2-methyl-2-butanol, 2-methoxy ethanol, 2-butoxyethanol), ketone (example: acetone, methyl ethyl keton, diethyl ketone, diisobutyl ketone, cyclohexanone, methylcyclohexanone), ester (example: methyl acetate, ethyl acetate, propyl acetate, ethyl formate, formic acid propyl, formic acid pentyl, butyl acetate, pentyl acetate, 2-ethoxy-ethyl acetate) and ether (example: tetrahydrofuran, methyl cellosolve, diisoprpyl ether, dimethoxymethane, dimethoxyethane, 1,4-dioxane, 1,3-dioxolane, anisole, phenetole).

Among these, halogenated hydrocarbon of which the number of carbon atom is from 1 to 7 is preferable, and the methylene chloride is the most preferable. From the viewpoint of the solubility of cellulose acylate, peel-apart property from support, mechanical strength of the film, the physical property of optical characteristics, etc., it is desirable to mix one or several kinds of ethyl alcohol of which the number of carbon atom is from 1 to 5 to the solvent in addition to the methylene chloride, Regarding the content of ethyl alcohol, it is desirable to be 2–25 mass % to the whole solvent, and more desirable to be 5–20 mass %. Concrete examples of alcohol are methanol, ethanol, n-propanol, isopropanol, n-butanol, etc., and methanol, ethanol, n-butanol or the mixture of these is preferably used.

With regard to the film stripped off from the casting support, it may be stretched uniaxially or biaxially.

The film produced with solvent casting process of the present invention can be variously utilized because there are no defects such as longitudinal streaks caused by slugs on the die lip portion of the casting die and it has a supremely uniform evenness.

It is, for example, appropriate for polarizing plates protective film, optical by functional films (optical compensation sheet, anti-reflection film, brightness improvement membrane, etc.), photographic films, etc., further, polarizing plates, liquid crystal display devices, etc.

The present invention shall be explained below in further details with reference to examples, but the present invention shall by no means be restricted by the following examples.

EXAMPLES

The material that were employed in the examples of the solvent casting process are as the following:

| | |
|---|---|
| Cellulose triacetate (acetification degree: 59.5) | 100 part by weight |
| Triphenylphostate | 10 part by weight |
| Biphenyldiphenylphosphate | 5 part by weight |
| Methyl acetate | 368 part by weight |
| Ethanol | 69 part by weight |
| Butanol | 23 part by weight |

The results are shown below;

TABLE 1

| | Lip Material | Sol. Temp. (° C.) | Sep. F. (g/cm) | Static Draw. F. (Pa) | Dynamic Draw. F. (Pa) | Solvent | Slug Formtn. | Bead Break |
|---|---|---|---|---|---|---|---|---|
| Ex. 1 | SUS316 | 30 | 80 | 500 | 8000 | Methylene Chloride | No | No |
| Ex. 2 | Teflon | 50 | 10 | 90 | 1400 | Methylene Chloride | No | No |
| Ex. 3 | SUS316 | 50 | 80 | 150 | 3000 | Methanol | No | No |
| C. Ex. 1 | SUS316 | 0 | 80 | 2500 | 17000 | Methanol | No | Brkn. |
| C. Ex. 2 | 8U8316 | 50 | 80 | 90 | 1400 | Methylene Chloride | Formed | No |

In Table 1, "Ex.", "C.", "Sol.", "Temp.", "Sep.", "F", "Draw.", "Formn", and "Brkn" are abbreviations of "Example", "Comparative", "Solution", "Temperature"; "Separation", "Force", "Drawing", "Formation" and "Broken" respectively.

<Measuring Method of Stress in Static Drawing>

Figure 2:
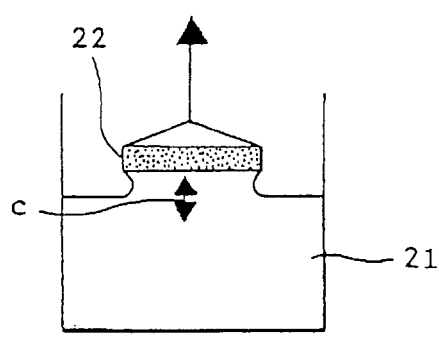
FIG. 2 is a drawing which shows measuring method of stress in drawing.
Figure 3:
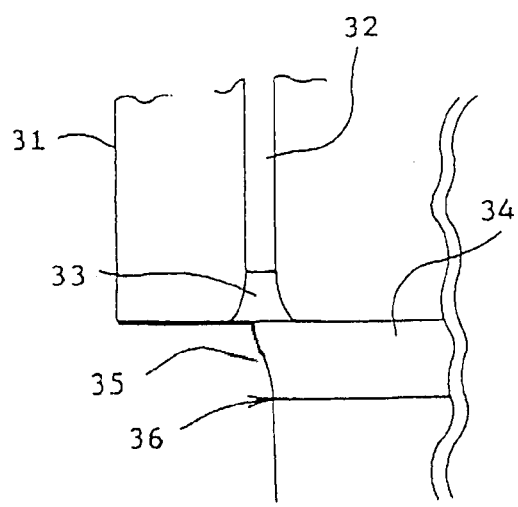
FIG. 3 is a schematic illustration which shows the situation that the slugs at lateral edge portions are formed in a conventional solvent casting process.

Measured by means of apparatus shown in FIG. 2.

In FIG. 2, numerical symbol 21 shows dope reserved in a container, numerical symbol 22 shows a flat plate formed by the material same as the die lip of the casting die. After making the surface of flat plate 22 in contact with the dope 21, measuring the force during raising the flat plate 22 with a spring balance, thereby calculate the stress "c" in drawing.

EFFECTS OF THE INVENTION

According to the present invention, the employment of the foregoing constitution prevents the formation of the slugs at lateral edge portions of the dope because the cast dope would not adhere to the die lip end portion of the casting die. As a result, because a breaking down of the film would not occur without washing the apparatus, an efficient production of a film having superior evenness in the flatness can be achieved.

The invention has been described in detail with particular reference to preferred embodiments thereof, but it will be understood that variations and modifications can be effected within the spirit and scope of the invention as set forth in the claims.

What is claimed is:

1. A solvent casting process which comprises casting a dope which is a solution containing at least one kind of a polymer from a casting die onto a casting support, wherein a force necessary for separating the dope from a die lip end of the casting die is 40 g/cm or smaller.

2. A solvent casting process which comprises casting a dope which is a solution containing at least one kind of a polymer from a casting die onto a casting support, wherein a static drawing tension of the dope is made in range of 100–2000 Pa.

3. The solvent casting process according to claim 2, wherein defining a shear viscosity of the dope in the casting die as $\eta$ [Pa·s], and defining a drawing velocity of the dope while being cast from the casting die to landing the casting support as $\epsilon$ [1/second], a dynamic drawing force "$3 \cdot \eta \cdot \epsilon$" satisfies the following formula (1):

$$1500[Pa] < 3 \cdot \eta \cdot \epsilon < 15000[Pa] \qquad (1).$$

4. The solvent casting process according to claim 3, wherein variation of a "$\eta \cdot \epsilon$" is 30% or smaller of the average value.

5. The solvent casting process according to claim 2, wherein defining a temperature of the dope cast from the casting die as T [° C.] and defining a feeding temperature of the dope until just before the casting die as Tp [° C.], a relation between Tc and Tp satisfies the following formula (2);

$$Tp - 50 < Tc < Tp \qquad (2).$$

6. The solvent casting process according to claim 5, wherein the force necessary for separating the dope from a die lip end of the casting die is 40 g/cm or smaller.

7. The solvent casting process according to claim 2, wherein a mixed solvent containing a solvent substantially without having solubility with the polymer of the dope is dripped to the die lip of the casting die.

8. The solvent casting process according to claim 7, wherein the mixed solvent contains said solvent substantially without having solubility with the polymer of the dope in an amount of from 5% to 100%.

9. The solvent casting process according to claim 7, wherein defining a temperature of the dripping solution as Ts [° C.] and defining a temperature of the dope being cast as Td [° C.], a relation between Ts and Td satisfies the following formula (3):

$$Td-50<Ts<Td+10 \qquad (3).$$

10. The solvent casting process according to claim 1, wherein the force necessary for separating the dope from the lateral edges of the die lip end of th casting die is 40 g/cm or smaller.

11. The solvent casting, process according to claim 10, wherein the amount of said solvent dripping at the lateral edge portion of the die lip of the casting die is in the range from 0.02 milliliter/minute to 1.0 milliliter/minute as a flow rate, and variation of the flow rate in the lateral edge portions is 30% or smaller of the average value.

12. The solvent casting process according to claim 1, wherein a flow rate of a dripping solvent, in the case where the solvent is fed to at least one side of the bead, is in a range from 2 milliliter/minute to 1000 milliliter/minute per 1 m of the liquid contact area of the die lip excluding the lateral edge portions, and variation of flow rate of the solvent is 30% or smaller of the average value.

13. The solvent casting process according to claim 7, wherein said dripping solution contains at least one kind of surfactant.

14. The solvent casting process according to claim 7, wherein said dripping solution contains at least one kind of separation accelerating agent.

15. The solvent casting process according to claim 2, wherein the force necessary for separating the dope from the lateral edges of the die lip end of the casting die is 40 g/cm or smaller.

* * * * *